United States Patent
Nishida

(10) Patent No.: US 7,319,311 B2
(45) Date of Patent: Jan. 15, 2008

(54) STEP DOWN SWITCHING REGULATOR WITH THE SUBSTRATE OF THE SWITCHING TRANSISTOR SELECTIVELY CONNECTED TO EITHER ITS DRAIN OR SOURCE

(75) Inventor: Junji Nishida, Osaka (JP)

(73) Assignee: Ricoh Company, Ltd., Tokyo (JP)

(*) Notice: Subject to any disclaimer, the term of this patent is extended or adjusted under 35 U.S.C. 154(b) by 47 days.

(21) Appl. No.: 10/572,618

(22) PCT Filed: Jul. 15, 2005

(86) PCT No.: PCT/JP2005/013528

§ 371 (c)(1),
(2), (4) Date: Mar. 17, 2006

(87) PCT Pub. No.: WO2006/009268

PCT Pub. Date: Jan. 26, 2006

(65) Prior Publication Data

US 2007/0057655 A1   Mar. 15, 2007

(30) Foreign Application Priority Data

Jul. 20, 2004   (JP) ............... 2004-211493

(51) Int. Cl.
  *G05F 1/56* (2006.01)
(52) U.S. Cl. .............. 323/284; 323/268; 323/272; 323/285; 323/299
(58) Field of Classification Search ........... 323/268, 323/272, 274, 275, 284, 285, 299, 303
See application file for complete search history.

(56) References Cited

U.S. PATENT DOCUMENTS

| 6,586,958 | B2* | 7/2003 | Sudo et al. ............. 324/765 |
| 6,940,189 | B2* | 9/2005 | Gizara .................. 307/151 |
| 6,954,055 | B2* | 10/2005 | Umemoto et al. ......... 323/284 |
| 7,061,218 | B2* | 6/2006 | Ito .................... 323/351 |
| 7,170,272 | B2* | 1/2007 | Yoshida ................ 323/284 |
| 7,250,745 | B2* | 7/2007 | Yasukouchi et al. ...... 323/284 |
| 2003/0231011 | A1* | 12/2003 | Umemoto et al. ......... 323/284 |
| 2004/0100240 | A1 | 5/2004 | Natsume et al. |
| 2005/0285579 | A1* | 12/2005 | Yasukouchi et al. ...... 323/282 |
| 2006/0152205 | A1* | 7/2006 | Tang et al. ............ 323/284 |
| 2007/0057655 | A1* | 3/2007 | Nishida ................ 323/282 |

FOREIGN PATENT DOCUMENTS

JP    6-70544    3/1994

(Continued)

*Primary Examiner*—Jeffrey Sterrett
(74) *Attorney, Agent, or Firm*—Cooper & Dunham, LLP

(57) ABSTRACT

A switching regulator is disclosed that is able to prevent reverse direction current flow without using a dedicated diode even when a PMOS transistor is used as a switching transistor of a step-down switching regulator. A selection circuit is provided to control connection of the substrate gate of the switching transistor, and a control circuit controls the selection circuit to connect the substrate gate to the drain of the switching transistor when the voltage on an input terminal of the switching regulator is less than or equal to the voltage on the output terminal of the switching regulator, and connect the substrate gate to the source of the switching transistor when the voltage on the input terminal is greater than the voltage on the output terminal.

27 Claims, 4 Drawing Sheets

FOREIGN PATENT DOCUMENTS

| | | |
|---|---|---|
| JP | 6-105464 | 4/1994 |
| JP | 7-277107 | 10/1995 |
| JP | 10-111371 | 4/1998 |
| JP | 2002-84742 | 3/2002 |
| JP | 2002-325438 | 11/2002 |
| JP | 2003-216247 | 7/2003 |
| JP | 2004-21782 | 1/2004 |
| JP | 2004-173460 | 6/2004 |

* cited by examiner

STEP DOWN SWITCHING REGULATOR WITH THE SUBSTRATE OF THE SWITCHING TRANSISTOR SELECTIVELY CONNECTED TO EITHER ITS DRAIN OR SOURCE

TECHNICAL FIELD

The present invention relates to a switching regulator, a power supply circuit using the switching regulator, and a secondary cell charging circuit including the switching regulator, and particularly, to a switching regulator to an output terminal of which a voltage is applied and which has a circuit capable of preventing reverse direction flow of an electric current to an input terminal from a power supply connected to the output terminal.

BACKGROUND ART

In the related art, PMOS (P-channel metal oxide semiconductor) transistors are widely used as switching elements of step-down switching regulators, and voltage control elements of linear regulators. In addition, power supply circuits using PMOS transistors as control elements are employed in secondary cell charging circuits, in parallel running power supply circuits in which output terminals of plural power supplies are connected to each other to supply electric power to loads, and in backup power supply circuits for executing temporary circuit backup when the main power supply is turned off.

In these power supply circuits using PMOS transistors, when a voltage from another power supply circuit is applied to an output terminal of such a power supply circuit, if the power supply connected to an input terminal is disconnected, or the power supply experiences trouble, an electric current flows in a reverse direction to the input terminal from the output terminal, namely, reverse direction flow occurs. Further, in the parallel running power supply circuit, if the output voltages of the power supplies are different, reverse direction flow also occurs.

FIG. 4 is a circuit diagram illustrating an equivalent circuit of a transistor.

The reason for the reverse direction flow is explained below with reference to FIG. 4.

As illustrated in FIG. 4, a diode D1 is connected between a source S and a substrate gate (also referred to as "back gate") SG, and a diode D2 is connected between a drain D and the substrate gate SG. The diode D1 and the diode D2 are parasitic diodes produced when integrating the PMOS transistor into a semiconductor device.

Generally, when using a PMOS transistor as a switching element or a voltage control element of a power supply circuit, an input voltage is applied on the source S of the PMOS transistor, and an output voltage is extracted from the drain D of the PMOS transistor.

FIG. 5 is a circuit diagram showing an example of connection of the substrate gate to the PMOS transistor.

As illustrated in FIG. 5, in the PMOS transistor, the substrate gate SG is connected to the source S to short the parasitic diode D1. Hence, when the PMOS transistor is turned off, the parasitic diode D2 turns out to be inserted between the source and the drain in a reverse direction, so as to prevent conduction of a current from the source side connected to the input terminal to the drain side connected to the output terminal.

However, as described above, when a voltage is applied to the output terminal, if the power supply connected to the input terminal is disconnected, or the input voltage is lowered, the parasitic diode D2 ends up being turned on, and as a result, an electric current flows from the drain side connected to the output terminal to the source side connected to the input terminal, namely, reverse direction flow occurs. The reverse direction flow not only degrades efficiency of the power supply, but also causes a crash or a malfunction of the power supply circuit; hence, it is necessary to prevent the reverse direction flow.

In order to prevent the reverse direction flow in a parallel running power supply circuit in which plural power supply circuits are connected in parallel, usually, an OR diode is inserted between an output terminal of each of the power supply circuit and the load. For example, reference can be made to Japanese Laid Open Patent Application No. 6-105464.

In addition, also in the case of a secondary cell charging circuit, usually, a diode is used to prevent the reverse direction flow. When an NMOS (N-channel metal oxide semiconductor) transistor is used as a switching element of a step-down DC-DC converter, the NMOS transistor is able to prevent reverse direction flow. For example, reference can be made to Japanese Laid Open Patent Application No. 2002-84742.

However, since the forward voltage of a diode is about 0.1 $V_f$ an input voltage of the diode in the forward direction has to be set to additionally include the forward voltage. This may cause high power loss in a circuit for supplying a large current, and degrade the power efficiency. When an NMOS transistor is used as the switching element, a voltage much greater than the output voltage has to be applied to the gate of the switching element in order to drive the switching element. Due to this, compared to a switching element using the PMOS transistor, one has to increase the difference between the input voltage and the output voltage, or supply the gate voltage from a voltage source having a high output voltage. However, when increasing the difference between the input voltage and the output voltage, the power efficiency degrades, and when using the high output voltage source, the circuit turns out to be complicated and becomes expensive.

DISCLOSURE OF THE INVENTION

It is a general object of the present invention to solve one or more of the problems of the related art.

A specific object of the present invention is to provide a switching regulator capable of preventing reverse direction flow of an electric current without using a dedicated diode even when a PMOS transistor is used as a switching element of a step-down switching regulator, a power supply circuit including the switching regulator, and a secondary cell charging circuit including the switching regulator.

According to a first aspect of the present invention, there is provided a switching regulator that is a step-down switching regulator for converting a voltage applied to an input terminal to a predetermined voltage and outputting the predetermined voltage from an output terminal, said switching regulator comprising: a switching transistor formed from a PMOS transistor configured to switch ON or switch OFF output of the input voltage according to a control signal input to a control electrode; a smoothing circuit configured to smooth the output voltage from the switching transistor and output the smoothed voltage to the output terminal; a selection circuit configured to control connection of a substrate gate of the switching transistor according to the input control signal; and a switching transistor control circuit configured to control a switching operation of the switching transistor so that the voltage from the output terminal becomes the predetermined voltage, wherein the selection circuit connects the substrate gate to a drain of the switching transistor when the voltage on the input terminal is lower than or equal to the voltage on the output terminal, and connects the substrate gate to a source of the switching transistor when the voltage on the input terminal is higher than the voltage on the output terminal.

As an embodiment, the switching regulator further comprises a selection control circuit that compares the voltage on the input terminal to the voltage on the output terminal, and controls the selection operation of the selection circuit according to a comparison result, wherein the selection control circuit controls the selection circuit to connect the substrate gate to the drain of the switching transistor when the voltage on the input terminal is less than or equal to the voltage on the output terminal, and controls the selection circuit to connect the substrate gate to the drain of the switching transistor when the voltage on the input terminal is greater than the voltage on the output terminal.

As an embodiment, the selection operation of the selection circuit is controlled by an external selection control circuit according to the voltage on the input terminal and the voltage on the output terminal so that the selection circuit is controlled to connect the substrate gate to the drain of the switching transistor when the voltage on the input terminal is less than or equal to the voltage on the output terminal, and connect the substrate gate to the drain of the switching transistor when the voltage on the input terminal is greater than the voltage on the output terminal.

As an embodiment, the switching regulator further comprises a switching circuit that connects a gate of the switching transistor to the drain of the switching transistor, wherein when the voltage on the input terminal is less than or equal to the voltage on the output terminal, based on a control signal from the selection control circuit, the switching circuit connects the gate of the switching transistor to the drain of the switching transistor while the switching transistor control circuit stops output of the control signal to the gate of the switching transistor; and when the voltage on the input terminal is greater than the voltage on the output terminal, based on the control signal from the selection control circuit, the switching circuit disconnects the gate of the switching transistor from the source of the switching transistor while the switching transistor control circuit outputs the control signal to the gate of the switching transistor.

As an embodiment, the switching circuit includes a field effect transistor (FET).

As an embodiment, the selection circuit includes a field effect transistor (FET).

As an embodiment, the smoothing circuit includes a synchronization rectification transistor that is connected to the switching transistor in series and is controlled by the switching transistor control circuit to be switched on or switched off, wherein the switching transistor, the synchronization rectification transistor, the selection circuit, the selection control circuit, the switching transistor control circuit, and the switching circuit are integrated into one IC chip.

As an embodiment, the smoothing circuit includes a synchronization rectification transistor that is connected to the switching transistor in series and is controlled by the switching transistor control circuit to be switched on or switched off, wherein the switching transistor, the synchronization rectification transistor, the selection circuit, the switching transistor control circuit, and the switching circuit are integrated into one IC chip.

According to a second aspect of the present invention, there is provided a power supply circuit, comprising one or more step-down switching regulators configured to convert a voltage applied to an input terminal to a predetermined voltage and output the predetermined voltage from an output terminal; and one or more linear regulators, wherein the switching regulator comprises: a switching transistor formed from a PMOS transistor configured to switch ON or switch OFF output of the input voltage according to a control signal input to a control electrode; a smoothing circuit configured to smooth the output voltage from the switching transistor and output the smoothed voltage to the output terminal; a first selection circuit configured to control connection of a substrate gate of the switching transistor according to the input control signal, the first selection circuit connecting the substrate gate to a drain of the switching transistor when the voltage on the input terminal is less than or equal to the voltage on the output terminal, and connecting the substrate gate to a source of the switching transistor when the voltage on the input terminal is greater than the voltage on the output terminal; and a switching transistor control circuit configured to control a switching operation of the switching transistor so that the voltage from the output terminal becomes the predetermined voltage.

As an embodiment, the linear regulator comprises: a voltage control transistor that includes a PMOS transistor configured to control a current from the input terminal to the output terminal to control the voltage on the output terminal; a second selection circuit configured to control connection of the substrate gate of the voltage control transistor; a second switching transistor control circuit configured to control a switching operation of the switching transistor so that the voltage from the output terminal becomes the predetermined voltage; a second selection control circuit that controls the selection operation of the selection circuit according to the voltage on the input terminal and the voltage on the output terminal, the second selection circuit connecting the substrate gate to a drain of the voltage control transistor when the voltage on the input terminal is less than or equal to the voltage on the output terminal, and connecting the substrate gate to a source of the voltage control transistor when the voltage on the input terminal is greater than the voltage on the output terminal; and a voltage control transistor control circuit configured to control the voltage control transistor so that the voltage from the output terminal becomes the predetermined voltage.

As an embodiment, the switching regulator further comprises a first selection control circuit that compares the voltage on the input terminal to the voltage on the output terminal, and controls the selection operation of the first selection circuit according to a comparison result, wherein the first selection control circuit controls the first selection circuit to connect the substrate gate to the drain of the switching transistor when the voltage on the input terminal is less than or equal to the voltage on the output terminal, and controls the first selection circuit to connect the substrate gate to the drain of the switching transistor when the voltage on the input terminal is greater than the voltage on the output terminal.

As an embodiment, the selection operation of the first selection circuit is controlled by an external selection control circuit according to the voltage on the input terminal and the voltage on the output terminal so that the first selection circuit is controlled to connect the substrate gate to the drain of the switching transistor when the voltage on the input terminal is less than or equal to the voltage on the output terminal, and connect the substrate gate to the drain of the switching transistor when the voltage on the input terminal is greater than the voltage on the output terminal.

As an embodiment, the switching regulator further comprises a switching circuit that connects a gate of the switching transistor to the drain of the switching transistor, wherein when the voltage on the input terminal is less than or equal to the voltage on the output terminal, based on a control signal from the first selection control circuit, the switching circuit connects the gate of the switching transistor to the drain of the switching transistor while the switching transistor control circuit stops output of the control signal to the gate of the switching transistor; and when the voltage on the input terminal is greater than the voltage on the output terminal, based on the control signal from the first selection control circuit, the switching circuit disconnects the gate of the switching transistor from the source of the switching transistor while the switching transistor control circuit outputs the control signal to the gate of the switching transistor.

As an embodiment, the smoothing circuit includes a synchronization rectification transistor that is connected to the switching transistor in series and controlled by the switching transistor control circuit to be switched on or switched off, wherein the switching transistor, the synchronization rectification transistor, the first selection circuit, the first selection control circuit, the switching transistor control circuit, the switching circuit, and the linear regulator are integrated into one IC chip.

As an embodiment, the smoothing circuit includes a synchronization rectification transistor connected to the switching transistor in series and controlled by the switching transistor control circuit to be switched on or switched off, wherein the switching transistor, the synchronization rectification transistor, the first selection circuit, the switching transistor control circuit, the switching circuit, and the linear regulator are integrated into one IC chip.

According to a third aspect of the present invention, there is provided a power supply circuit, comprising: a plurality of step-down switching regulators each configured to convert a voltage applied on an input terminal to a predetermined voltage and output the predetermined voltage from an output terminal, wherein each of the switching regulators comprises: a switching transistor formed from a PMOS transistor configured to switch ON or switch OFF output of the input voltage according to a control signal input to a control electrode; a smoothing circuit configured to smooth the output voltage from the switching transistor and output the smoothed voltage to the output terminal; a selection circuit configured to control connection of a substrate gate of the switching transistor according to the input control signal, the selection circuit connecting the substrate gate to a drain of the switching transistor when the voltage on the input terminal is less than or equal to the voltage on the output terminal, and connecting the substrate gate to a source of the switching transistor when the voltage on the input terminal is greater than the voltage on the output terminal; and a switching transistor control circuit configured to control a switching operation of the switching transistor so that the voltage from the output terminal becomes the predetermined voltage.

As an embodiment, the switching regulator further comprises: a selection control circuit that compares the voltage on the input terminal to the voltage on the output terminal, and controls the selection operation of the selection circuit according to a comparison result, wherein the selection control circuit controls the selection circuit to connect the substrate gate to the drain of the switching transistor when the voltage on the input terminal is less than or equal to the voltage on the output terminal, and controls the selection circuit to connect the substrate gate with the source of the switching transistor when the voltage on the input terminal is greater than the voltage on the output terminal.

As an embodiment, the selection operation of the selection circuit is controlled by an external selection control circuit according to the voltage on the input terminal and the voltage on the output terminal so that the selection circuit is controlled to connect the substrate gate to the drain of the switching transistor when the voltage on the input terminal is less than or equal to the voltage on the output terminal, and connect the substrate gate to the drain of the switching transistor when the voltage on the input terminal is greater than the voltage on the output terminal.

As an embodiment, the switching regulator further comprises a switching circuit that connects a gate of the switching transistor to the drain of the switching transistor, wherein when the voltage on the input terminal is less than or equal to the voltage on the output terminal, based on a control signal from the selection control circuit, the switching circuit connects the gate of the switching transistor to the drain of the switching transistor while the switching transistor control circuit stops output of the control signal to the gate of the switching transistor; and when the voltage on the input terminal is greater than the voltage on the output terminal, based on the control signal from the selection control circuit, the switching circuit disconnects the gate of the switching transistor from the source of the switching transistor while the switching transistor control circuit outputs the control signal to the gate of the switching transistor.

As an embodiment, the smoothing circuit includes a synchronization rectification transistor that is connected to the switching transistor in series and is controlled by the switching transistor control circuit to be switched on or switched off, wherein the switching transistor, the synchronization rectification transistor, the selection circuit, the selection control circuit, the switching transistor control circuit, and the switching circuit are integrated into one IC chip.

As an embodiment, the smoothing circuit includes a synchronization rectification transistor that is connected to the switching transistor in series and is controlled by the switching transistor control circuit to be switched on or switched off, wherein the switching transistor, the synchronization rectification transistor, the selection circuit, the switching transistor control circuit, and the switching circuit are integrated into one IC chip.

According to a fourth aspect of the present invention, there is provided a secondary cell charging circuit, comprising a step-down switching regulator configured to convert a voltage applied on an input terminal to a predetermined voltage and output the predetermined voltage from an output terminal, a secondary cell being connected to the output terminal, wherein the switching regulator comprises: a switching transistor formed from a PMOS transistor configured to switch ON or switch OFF output of the input voltage according to a control signal input to a control electrode; a smoothing circuit configured to smooth the output voltage from the switching transistor and output the smoothed voltage to the output terminal; a selection circuit configured to control connection of a substrate gate of the switching transistor according to the input control signal, the selection circuit connecting the substrate gate to a drain of the switching transistor when the voltage on the input terminal is less than or equal to the voltage on the output terminal, and connecting the substrate gate to a source of the switching transistor when the voltage on the input terminal is greater than the voltage on the output terminal; and a switching transistor control circuit configured to control a switching operation of the switching transistor so that the voltage from the output terminal becomes the predetermined voltage.

As an embodiment, the switching regulator further comprises: a selection control circuit that compares the voltage on the input terminal to the voltage on the output terminal, and controls the selection operation of the selection circuit according to a comparison result, wherein the selection control circuit controls the selection circuit to connect the substrate gate to the drain of the switching transistor when the voltage on the input terminal is less than or equal to the voltage on the output terminal, and controls the selection circuit to connect the substrate gate to the drain of the switching transistor when the voltage on the input terminal is greater than the voltage on the output terminal.

As an embodiment, the selection operation of the selection circuit is controlled by an external selection control circuit according to the voltage on the input terminal and the voltage on the output terminal so that the selection circuit is controlled to connect the substrate gate to the drain of the switching transistor when the voltage on the input terminal is less than or equal to the voltage on the output terminal, and connect the substrate gate to the drain of the switching transistor when the voltage on the input terminal is greater than the voltage on the output terminal.

As an embodiment, the switching regulator further comprises: a switching circuit that connects a gate of the switching transistor to the drain of the switching transistor, wherein when the voltage on the input terminal is less than or equal to the voltage on the output terminal, based on a control signal from the selection control circuit, the switching circuit connects the gate of the switching transistor to the drain of the switching transistor while the switching transistor control circuit stops output of the control signal to the gate of the switching transistor; and when the voltage on the input terminal is greater than the voltage on the output terminal, based on the control signal from the selection control circuit, the switching circuit disconnects the gate of the switching transistor from the source of the switching transistor while the switching transistor control circuit outputs the control signal to the gate of the switching transistor.

As an embodiment, the smoothing circuit includes a synchronization rectification transistor that is connected to the switching transistor in series and is controlled by the switching transistor control circuit to be switched on or switched off, wherein the switching transistor, the synchronization rectification transistor, the selection circuit, the selection control circuit, the switching transistor control circuit, and the switching circuit are integrated into one IC chip.

As an embodiment, the smoothing circuit includes a synchronization rectification transistor that is connected to the switching transistor in series and is controlled by the switching transistor control circuit to be switched on or switched off, wherein the switching transistor, the synchronization rectification transistor, the selection circuit, the switching transistor control circuit, and the switching circuit are integrated into one IC chip.

According to the switching regulator and the secondary cell charging circuit of the present invention, when the voltage on the input terminal is less than or equal to the voltage on the output terminal, the selection circuit is controlled to connect the substrate gate of the switching transistor to the drain of the switching transistor, which is a PMOS transistor, and when the voltage on the input terminal is greater than the voltage on the output terminal, the selection circuit is controlled to connect the substrate gate of the switching transistor to the drain of the switching transistor. Due to this, even when a power supply is connected to the output terminal, it is possible to prevent the reverse direction flow of a current to the input terminal. Because a diode is not used for preventing the reverse direction flow, as in the related art, a voltage drop across the diode does not occur, and this further improves power efficiency.

According to the power supply circuit of the present invention, when the voltage on the input terminal is less than or equal to the voltage on the output terminal, the first selection circuit is controlled to connect the substrate gate of the switching transistor to the drain of the switching transistor, which is a PMOS transistor, and when the voltage on the input terminal is greater than the voltage on the output terminal, the first selection circuit is controlled to connect the substrate gate of the switching transistor to the drain of the switching transistor.

In addition, when the power supply circuit includes a switching regulator and a linear regulator to output specified voltages to the same output terminal, when the voltage on the input terminal is less than or equal to the voltage on the output terminal, the first and second selection circuits are controlled to connect the substrate gate of the switching transistor to the drain of the switching transistor, which is a PMOS transistor, and when the voltage on the input terminal is greater than the voltage on the output terminal, the first and second selection circuits are controlled to connect the substrate gate of the switching transistor to the drain of the switching transistor.

Due to this, even when a power supply is connected to the output terminal, it is possible to prevent the reverse direction flow of a current to the input terminal. Because a dedicated diode is not used for preventing the reverse direction flow, as in the related art, a voltage drop across the diode does not occur, and this further improves power efficiency.

These and other objects, features, and advantages of the present invention will become more apparent from the following detailed description of preferred embodiments given with reference to the accompanying drawings.

BEST MODE FOR CARRYING OUT THE INVENTION

Below, preferred embodiments of the present invention are explained with reference to the accompanying drawings.

Figure 1:
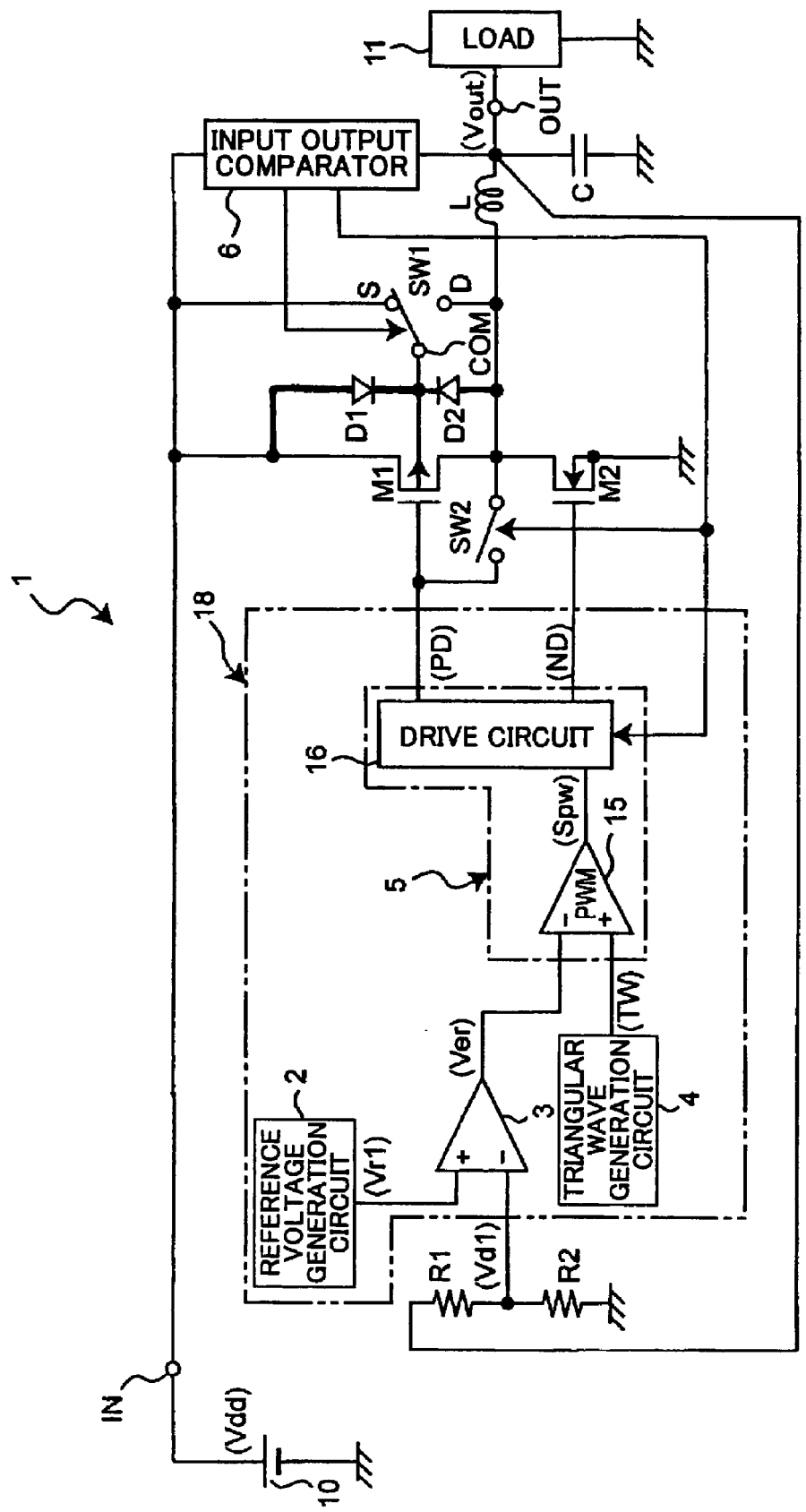
FIG. 1 is a circuit diagram exemplifying a switching regulator according to an embodiment of the present invention.

FIG. 1 is a circuit diagram exemplifying a switching regulator according to an embodiment of the present invention.

As illustrated in FIG. 1, in a step-down switching regulator 1, a DC (direct current) power supply 10 is connected between an input terminal IN and ground, and the DC power supply 10 supplies an input voltage Vdd to the input terminal IN. The step-down switching regulator 1 converts the input voltage Vdd to a predetermined voltage and outputs the predetermined voltage from an output terminal OUT. A load 11 is connected between the output terminal OUT and ground.

The switching regulator 1 includes a switching transistor M1, which is a PMOS transistor, for controlling outputting of the input voltage Vdd supplied to the input terminal IN, a synchronization rectification transistor M2, which is an NMOS transistor, an inductor L and a condenser C for smoothing a voltage signal, and resistors R1, R2 which divide a voltage Vout output from the output terminal OUT to generate a divisional voltage VdI (thus, the resistors R1, R2 are referred to as "output voltage detection resistors").

In addition, the switching regulator 1 includes a reference voltage generation circuit 2 which generates a certain reference voltage VrI, an error amplifier 3 which compares the divisional voltage VdI to the reference voltage VrI, and generates a voltage Ver according to the comparison result, a triangular wave generation circuit 4 which generates a triangular wave TW having a specified frequency, and a PWM control circuit 5 which performs PWM control on the switching transistor M1 and the synchronization rectification transistor M2 based on the output voltage Ver from the error amplifier 3 and the triangular wave TW, so as to switch ON or switch OFF the switching transistor M1 and the synchronization rectification transistor M2.

In addition, the switching regulator 1 includes a selection switch SW1 for controlling connection of a substrate gate of the switching transistor M1, and a switch SW2 that connects the gate and the drain of the switching transistor M1, an input output comparator 6 which compares the input voltage Vdd to the output voltage Vout, and controls operations of the selection switch SW1 and the switch SW2 according to the comparison result.

In the switching transistor M1, a parasitic diode D1 is formed between the source and the substrate gate (also referred to as "back gate"), and a parasitic diode D2 is formed between the drain and the substrate gate.

The reference voltage generation circuit 2, the error amplifier 3, the triangular wave generation circuit 4, and the PWM control circuit 5 constitute a switching control circuit 18. In addition, in the switching regulator 1, except for the inductor L and the condenser c, other elements can be integrated into one IC chip.

Further, the synchronization rectification transistor M2, the inductor L and the condenser C correspond to the smoothing circuit in claims, the selection switch SW1 corresponds to the selection circuit in claims, the selection switch SW2 corresponds to the switching circuit in claims, the input output comparator 6 corresponds to the selection control circuit in claims, and the reference voltage generation circuit 2, the error amplifier 3, the triangular wave generation circuit 4, the PWM control circuit 5 (namely, the switching control circuit 18), and the resistors R1, R2 constitute the switching transistor control circuit in claims.

The PWM control circuit 5 includes a PWM circuit 15 and a drive circuit 16. The PWM circuit 15 generates a pulse signal Spw for PWM control from the output voltage Ver from the error amplifier 3 and the triangular wave TW output by the triangular wave generation circuit 4.

The drive circuit 16, in response to the pulse signal Spw from the PWM circuit 15, generates a control signal PD for switching operation of the switching transistor M1, and generates a control signal ND for switching operation of the synchronization rectification transistor M2 to drive the switching transistor M1 and the synchronization rectification transistor M2

The switching transistor M1 and the synchronization rectification transistor M2 are connected in series between the input terminal IN and ground; the inductor L is connected between the output terminal OUT and the connecting portion of the switching transistor M1 and the synchronization rectification transistor M2; the condenser C is connected between the output terminal OUT and ground; and in parallel with the condenser c, the resistors R1 and R2 are connected between the output terminal OUT and ground in series. The connecting portion of the resistors R1 and R2 is connected to an inverted input terminal of the error amplifier 3, and the reference voltage VrI is input to the non-inverted input terminal of the error amplifier 3.

The output voltage Ver from the error amplifier 3 is supplied to the inverted input terminal of a comparator, which serves as the PWM circuit 15. The pulse signal Spw from the PWM circuit 15 is supplied to the non-inverted input terminal of the drive circuit 16. The drive circuit 16 supplies the control signal PD to the gate of the switching transistor M1 for switching control of the switching transistor M1, and supplies the control signal ND to the gate of the synchronization rectification transistor M2 for switching control of the synchronization rectification transistor M2.

A COM terminal of the selection switch SW1 is connected to the substrate gate of the switching transistor M1, an S terminal of the selection switch SW1 is connected to the source of the switching transistor M1, and a D terminal of the selection switch SW1 is connected to the drain of the switching transistor M1.

The switch SW2 is connected between the gate and the drain of the switching transistor M1.

The voltage on the input terminal IN and the voltage on the output terminal OUT are input to the input output comparator 6, and in response to the difference between the two voltages, the input output comparator 6 controls switching ON and switching OFF of the selection switch SW1 and the switch SW2, and controls outputting of the control signals PD and ND in the drive circuit 16.

With the above configuration, the switching transistor M1 is switched ON or OFF. When the switching transistor M1 is switched ON, an electric current is supplied to the inductor L. At this moment, the synchronization rectification transistor M2 is turned OFF. When the switching transistor M1 is switched OFF, the synchronization rectification transistor M2 is turned ON, and the energy stored in the inductor L is released through the synchronization rectification transistor M2 The current generated at this moment is smoothed by the condenser c, and is output to the load 11 through the output terminal OUT.

The output voltage Vout from the output terminal OUT is divided by the voltage detection resistors R1, R2, and the divisional voltage VdI is input to the inverted input terminal of the error amplifier 3.

When the output voltage Vout of the switching regulator 1 rises, the output voltage of the error amplifier 3 is lowered, and thus, the duty cycle of the pulse signal Spw, which is output from the PWM circuit 15, decreases. As a result, the duration when the switching transistor M1 is ON becomes short, and the output voltage Vout of the switching regulator 1 is controlled to be lowered. To the contrary, when the output voltage Vout of the switching regulator 1 lowers, operations opposite to the above are executed, and in this way, the output voltage Vout of the switching regulator 1 is controlled to be constant.

When the voltage on the input terminal IN is less than or equal to the voltage on the output terminal OUT, the input output comparator 6 connects the COM terminal to the D terminal so as to connect the substrate gate with the drain of the switching transistor M1. At the same time, the input output comparator 6 turns on the switch SW2, and connects the gate of the switching transistor M1 with the drain of the switching transistor M1, and stops outputting the control signal PD from the drive circuit 16, thereby making the output terminal OUT to be in a high impedance state. Here, although it is assumed that the voltage on the input terminal IN is less than or equal to the voltage on the output terminal OUT, the same is true even when the input terminal IN is less than or approximately equal to the voltage on the output terminal OUT.

In this way, the parasitic diode D2 of the switching transistor M1 is shorted, and in the switching transistor M1, the parasitic diode D1 is in a connection state along a direction from the source to the substrate gate. Due to this, the switching transistor M1 is able to prevent current flow from the output terminal OUT to the input terminal IN with the parasitic diode D1.

When the voltage on the input terminal IN is greater than the voltage on the output terminal OUT, the input output comparator 6 connects the COM terminal to the S terminal so as to connect the substrate gate to the source of the switching transistor M1. At the same time, the input output comparator 6 turns off the switch SW2, and disconnects the gate of the switching transistor M1 from the drain of the switching transistor M1, and starts outputting the control signal PD to the drive circuit 16. Here, although it is assumed that the voltage on the input terminal IN is higher than the voltage on the output terminal OUT, but the same is true even when the input terminal IN is higher than the voltage on the output terminal OUT by a certain value.

In this way, the parasitic diode D1 of the switching transistor M1 is shorted, and in the switching transistor M1, and the parasitic diode D2 is in a connection state along a direction from the drain to the substrate gate. Due to this, the switching transistor M1, is able to prevent current flow from the input terminal IN to the output terminal OUT with the parasitic diode D2.

Figure 2:
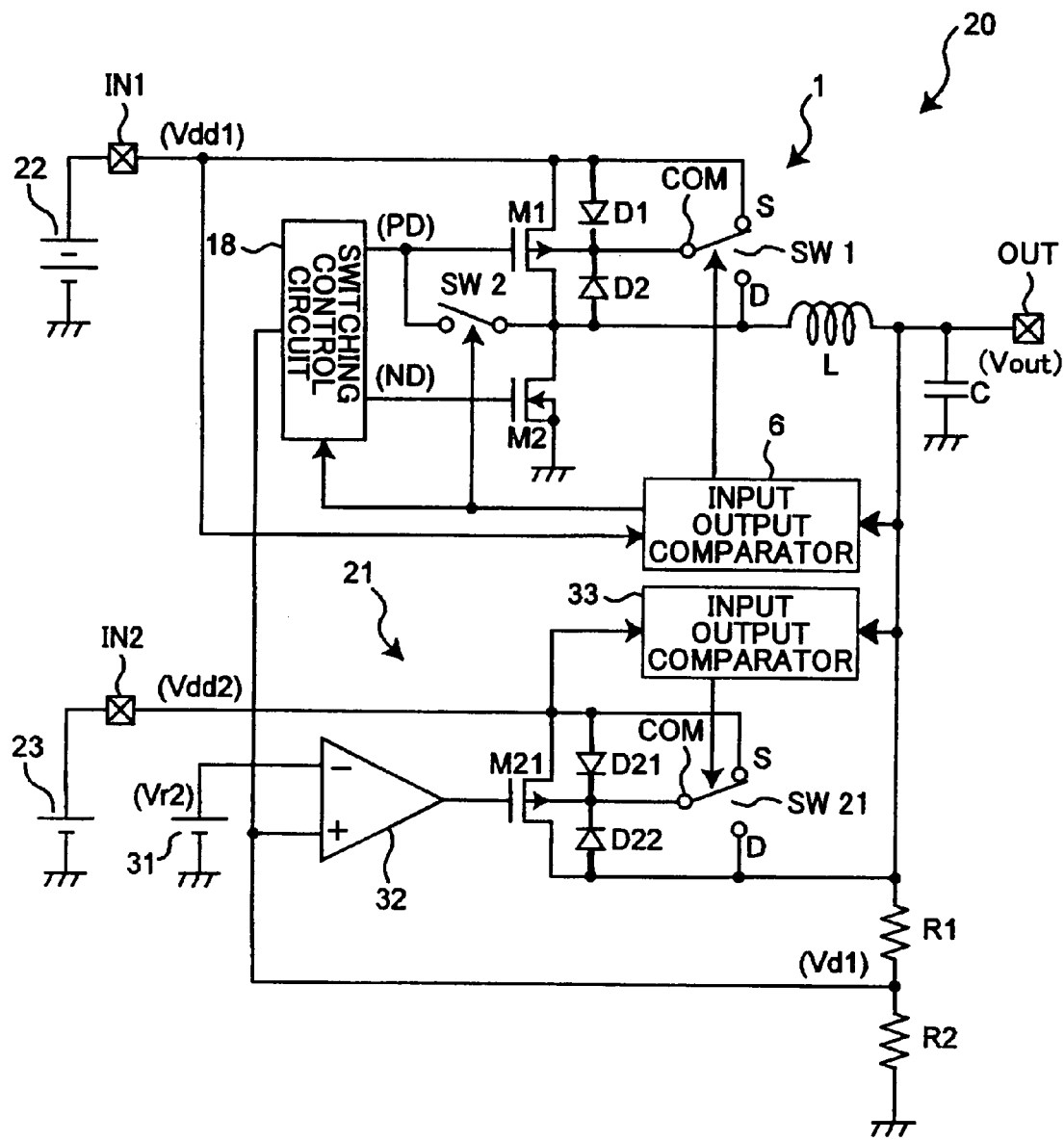
FIG. 2 is a circuit diagram exemplifying a power supply circuit which employs the switching regulator 1 in FIG. 1.

FIG. 2 is a circuit diagram exemplifying a power supply circuit which employs the switching regulator 1 in FIG. 1. In FIG. 2, the same reference numbers are assigned to the same elements as those in FIG. 1, and overlapping descriptions are omitted.

As illustrated in FIG. 2, a power supply circuit 20 includes the switching regulator 1 and a linear regulator 21. Output terminals of the switching regulator 1 and the linear regulator 21 are connected to the output terminal OUT of the power supply circuit 20. The input terminal of the switching regulator 1 is connected to the input terminal IN1 of the power supply circuit 20, and the input terminal of the linear regulator 21 is connected to the input terminal IN2 of the power supply circuit 20.

A DC power supply 22, such as a battery cell, is connected between the input terminal IN1 and ground, and the DC power supply 22 supplies an input voltage Vdd1 to the input terminal IN1.

In addition, a DC power supply 23, such as a battery cell, is connected between the input terminal IN2 and ground, and the DC power supply 23 supplies an input voltage Vdd2 to the input terminal IN2.

The linear regulator 21 includes a reference voltage generation circuit 31 which generates a reference voltage Vr2; an error amplifier 32 which compares the divisional voltage VdI to the reference voltage Vr2, and generates a voltage signal in response to the comparison result; a voltage control transistor M21, which is a PMOS transistor and acts to output a current in response to a voltage input from the error amplifier 32 to control the voltage on the output terminal OUT; a selection switch SW21 which controls connection of the substrate gate of the voltage control transistor M21; and an input output comparator 33 which compares the input voltage Vdd2 on the input terminal IN2 to the output voltage on the output terminal OUT, and controls operations of the selection switch SW21 in response to the comparison result.

In the voltage control transistor M21, a parasitic diode D21 is formed between the source and the substrate gate, and a parasitic diode D22 is formed between the drain and the substrate gate.

The switching regulator 1 and the linear regulator 21 commonly share the condenser C and the voltage detection resistors R1 and R2. In addition, except for the inductor L and the condenser c, other elements of the switching regulator 1 and the linear regulator 21 can be integrated into one IC chip.

Further, the selection switch SW1 corresponds to the first selection circuit in claims, the switching control circuit 18 and the resistors R1, R2 constitute the switching transistor control circuit in claims, the selection switch SW21 corresponds to the second selection circuit in claims, the input output comparator 33 corresponds to the second selection control circuit in claims, and the reference voltage generation circuit 31, the error amplifier 32, and the resistors R1, R2 constitute the voltage control transistor control circuit in claims.

The linear regulator 21 converts the input voltage Vdd2 to a predetermined voltage and outputs the predetermined voltage from the output terminal OUT. A load 11 is connected between the output terminal OUT and ground.

The voltage control transistor M21 is connected between the input terminal IN2 and the output terminal OUT. The connecting portion of the resistors R1 and R2 is connected to the non-inverted input terminal of the error amplifier 32, and the reference voltage Vr2 is input to the inverted input terminal of the error amplifier 32. The output terminal of the error amplifier 32 is connected to the gate of the voltage control transistor M21.

The COM terminal of the selection switch SW21 is connected to the substrate gate of the voltage control transistor M21, an S terminal of the selection switch SW21 is connected to the source of the voltage control transistor M21, and a D terminal of the selection switch SW21 is connected to the drain of the voltage control transistor M21.

The voltage on the input terminal IN2 and the voltage on the output terminal OUT are input to the input output comparator 33, and in response to the difference between the two voltages, the input output comparator 33 controls switching ON and switching OFF the selection switch SW21.

The linear regulator 21 serves as a backup power supply of the step-down switching regulator 1, which acts as a main power supply. The output voltage of the linear regulator 21 is set to be slightly lower than the output voltage of the switching regulator 1.

Below, descriptions are made assuming that the voltage Vdd1 of the battery cell 22 is 5 V, the output voltage of the switching regulator 1 is 2.5 V, the voltage Vdd2 of the battery cell 23 is 3 V, and the output voltage of the linear regulator 21 is 2.4 V.

When the switching regulator 1 is in operation, the output voltage Vout of the output terminal becomes 2.5 V. Since the voltage Vdd1 on the input terminal IN1 is 5V, it is greater than the output voltage Vout of the output terminal. Hence, the input output comparator 6 controls the switch SW1 so as to connect the substrate gate with the source of the switching transistor M1. At this moment, as described above, the input output comparator 6 turns off the switch SW2, disconnects the gate of the switching transistor M1 from the drain of the switching transistor M1, and starts outputting the control signal PD from the switching control circuit 18.

Similarly, in the linear regulator 21, since the voltage Vdd2 on the input terminal IN2 is 3 V, it is greater than the output voltage Vout of the output terminal, so the input output comparator 33 controls the selection switch SW21 so as to connect the substrate gate to the source of the voltage control transistor M21.

In the voltage control transistor M21, even when the substrate gate is connected to the source with the selection switch SW21, since the voltage Vdd2 on the input terminal IN2 is greater than the output voltage Vout of the output terminal OUT, the parasitic diode D22 of the voltage control transistor M21 is turned off, and the reverse direction flow of the current does not occur.

When the switching regulator 1 is not in operation, as the linear regulator 21 supplies electric power to the output terminal OUT, the voltage Vout on the output terminal OUT becomes 2.4 V. In this state, although the switch SW1 is controlled so that the substrate gate of the switching transistor M1 is connected to the source of the switching transistor M1, a voltage of 5 V is applied on the input terminal IN1 of the switching regulator 1, so the switching transistor M1 does not cause reverse direction current flow.

In addition, when the DC power supply 22 of the switching regulator 1 is not present, because the linear regulator 21 supplies electric power to the output terminal OUT, the voltage on the output terminal OUT becomes 2.4 V. In this state, the voltage Vdd1 on the input terminal IN1 of the switching regulator 1 decreases to be close to the output voltage Vout. Due to this, the input output comparator 6 switches the selection switch SW1 so as to connect the substrate gate to the drain of the switching transistor M1, turns on the switch SW2 to connect the gate of the switching transistor M1 to the drain of the switching transistor M1, and simultaneously sets the output terminal in a high impedance state to stop outputting of the control signal PD. Due to this, the parasitic diode D1 turns out to be inserted between the output terminal OUT and the input terminal IN1 in the reversed direction, and this enables prevention of the reverse direction current flow.

Next, when the battery cell 23 of the linear regulator 21 is not present, if the switching regulator 1 is in operation, the voltage on the output terminal OUT becomes 2.5 V. In this state, the voltage Vdd2 on the input terminal IN2 of the linear regulator 21 decreases to be close to the output voltage Vout on the output terminal OUT. Due to this, the input output comparator 33 switches the selection switch SW21 so as to connect the substrate gate with the drain of the voltage control transistor M21. Due to this, the parasitic diode D21 turns out to be inserted between the output terminal OUT and the input terminal IN2 in the reversed direction, and this enables prevention of the reverse direction current flow.

In the above, the descriptions are made with the power supply circuit 20 as shown in FIG. 2 as an example, which includes the switching regulator 1 and the linear regulator 21, but the present embodiment is also applicable to a power supply circuit including only a number of step-down switching regulators having the same output voltage, or a power supply circuit including only a number of linear regulators, and the power supply circuit is in a parallel running mode, namely, output terminals OUT of the switching regulators or linear regulators are connected to each other. Also in such a power supply circuit, each of the switching regulators or linear regulators is able to prevent the reverse direction current flow.

As described above, when the voltage on the input terminal is less than or equal to the voltage on the output terminal, the selection transistor is switched so as to connect the substrate gate with the drain of the switching transistor or the voltage control transistor, which is a PMOS transistor. When the voltage on the input terminal is greater than the voltage on the output terminal, the selection transistor is switched so as to connect the substrate gate with the source of the switching transistor or the voltage control transistor. And as a result, it is possible to prevent the reverse direction current flow from the output terminal to the input terminal.

Here, as comparison conditions of the input output comparator, it is assumed that the voltage on the input terminal is less than or equal to the voltage on the output terminal. However, when the voltage on the output terminal appears on the input terminal through the parasitic diode D2, if the current is very small, the voltage on the input terminal is approximately equal to the voltage on the output terminal. Therefore, taking into consideration offset voltages or other uncertainties in the input output comparator, it can be designated to connect the substrate gate with the drain when the voltage on the input terminal is lowered to a value slightly higher than the voltage on the output terminal.

In addition, as the condition for connecting the substrate gate back to the source, it is assumed that the voltage on the input terminal is higher than the voltage on the output terminal, but this condition may also be designated to connect the substrate gate back to the source when the voltage on the input terminal is higher than the voltage on the output terminal by a certain value. In this case, the certain voltage value may be approximately determined based on the AC adaptor actually connected to the input terminal, and based on the relation between the input voltage and the output voltage.

Figure 3:
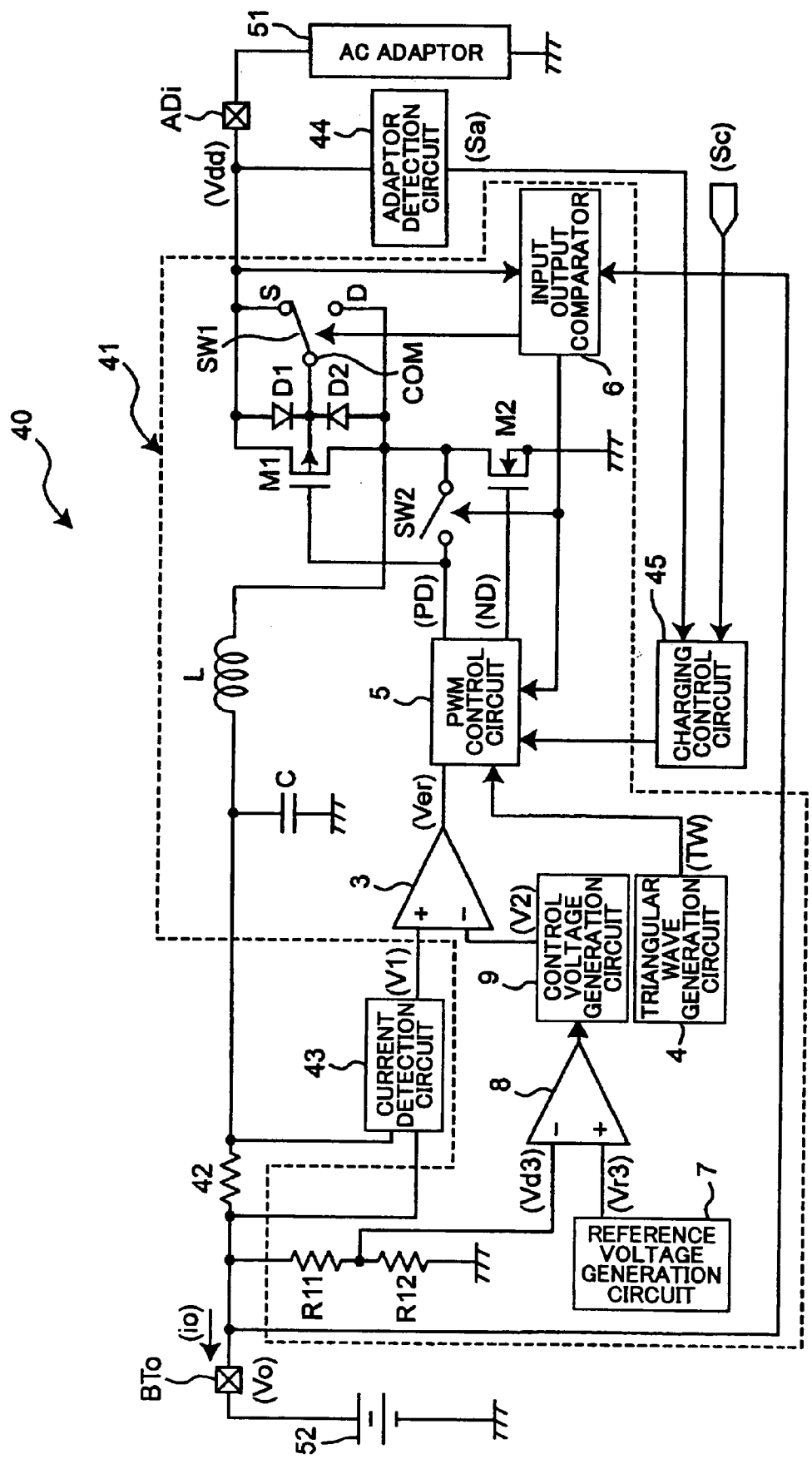
FIG. 3 is a circuit diagram exemplifying another switching regulator according to an embodiment of the present invention.
Figure 4:
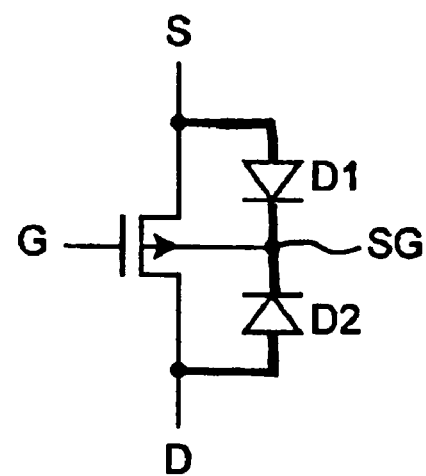
FIG. 4 is a circuit diagram illustrating an equivalent circuit of a PMOS transistor.
Figure 5:
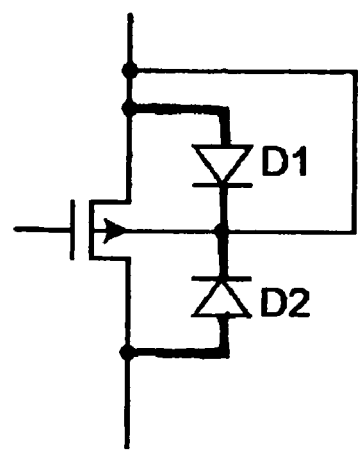
FIG. 5 is a circuit diagram showing an example of connection of the substrate gate to the PMOS transistor.

FIG. 3 is a circuit diagram exemplifying another switching regulator according to an embodiment of the present invention. FIG. 3 illustrates usage of the switching regulator in a secondary cell charging circuit. In addition, In FIG. 3, the same reference numbers are assigned to the same elements as those in FIG. 1, and overlapping descriptions are omitted.

As illustrated in FIG. 3, a charging circuit 40 uses an AC adaptor 51, which is connected to an input terminal ADi, to charge a secondary cell 52, which is connected to an output terminal BTo.

The charging circuit 40 includes a step-down switching regulator 41, a charging current detection resistor 42 that converts a charging current io flowing to the output terminal BTo to a voltage, a current detection circuit 43 that generates a voltage V1 related to the charging current io from the voltages at the two ends of the resistor 42 and controls operations of the switching regulator 41, an adaptor detection circuit 44 that detects whether the AC adaptor 51 is connected to the input terminal ADi and outputs a signal Sa indicating the detection result, and a charging control circuit 45 that turns ON or OFF the switching regulator 41 in response to the signal Sa from the adaptor detection circuit 44 and a control signal Sc from outside.

The switching regulator 41 includes a switching transistor M1, which is a PMOS transistor, for controlling outputting of the input voltage Vdd supplied to the input terminal ADi, a synchronization rectification transistor M2, which is an NMOS transistor, an inductor L and a condenser C for smoothing a voltage signal, and output voltage detection resistors R1I, R12 which divide a voltage Vo output from the output terminal BTo to generate a divisional voltage Vd3.

In addition, the switching regulator 41 includes a reference voltage generation circuit 7 which generates a certain reference voltage Vr3; an error amplifier 8 which compares the divisional voltage Vd3 to the reference voltage Vr3, and generates a voltage in response to the comparison result; and a control voltage generation circuit 9 which generates a control voltage V2 in response to the output voltage from the error amplifier 8.

In addition, the switching regulator 41 includes an error amplifier 3 which compares the voltage V1 output from the current detection circuit 43 to the control voltage V2 from the control voltage generation circuit 9, and generates a voltage Ver in response to the comparison result; a triangular wave generation circuit 4 which generates a triangular wave TW having a specified frequency; and a PWM control circuit 5 which, based on the output voltage Ver from the error amplifier 3 and the triangular wave TW, performs the PWM control on the switching transistor M1 and the synchronization rectification transistor M2 so as to switch ON or switch OFF the switching transistor M1 and the synchronization rectification transistor M2.

In addition, the switching regulator 41 includes a selection switch SW1 for controlling connection of a substrate gate of the switching transistor M1 and a switch SW2 that connects the gate and the drain of the switching transistor M1 an input output comparator 6 which compares the input voltage on the input terminal ADi to the output voltage on the output terminal BTo and controls operations of the selection switch SW1 and the switch SW2 according to the comparison result.

Except for the inductor L and the condenser c, other elements of the charging circuit 40 can be integrated into one IC chip. Further, the error amplifiers 3, 8, the triangular wave generation circuit 4, and the PWM control circuit 5, the reference voltage generation circuit 7, and the resistors RI1, R12 constitute a control circuit.

The switching transistor M1 and the synchronization rectification transistor M2 are connected in series between the input terminal ADi and ground, the inductor L is connected to the connecting portion of the switching transistor M1 and the synchronization rectification transistor M2, and the condenser C is connected between the other end of the inductor L and ground.

One end of the resistor 42 is connected to the connecting portion of the inductor L and the condenser c, which form the output end of the switching regulator 41. The other end of the resistor 42 is connected to the output terminal BTo.

The resistors R1I and R12 are connected between the output terminal BTo and ground in series. The connecting portion of the resistors RI1 and R12 is connected to the inverted input terminal of the error amplifier 8, and the reference voltage Vr3 is input to the non-inverted input terminal of the error amplifier 8.

The output voltage from the error amplifier 8 is supplied to the control voltage generation circuit 9, and the control voltage V2 output from the control voltage generation circuit 9 is input to the inverted input terminal of the error amplifier 3.

Before the divisional voltage Vd3 equals the reference voltage Vr3, the output voltage from the error amplifier 8 is nearly equal to a power voltage of the error amplifier 8, and the control voltage V2 output from the control voltage generation circuit 9 is constant. Because PWM control is performed so that the constant voltage V2 nearly equals the voltage V1 output from the current detection circuit 43, in this period, a constant current is supplied to the secondary cell 52 to charge the secondary cell 52.

When the divisional voltage Vd3 exceeds the reference voltage Vr3, the output voltage from the error amplifier 8 decreases, and in response to the decrease of the output voltage, the control voltage V2 output from the control voltage generation circuit 9 decreases gradually, and the PWM control circuit 5 performs PWM control on the switching transistor M1 and the synchronization rectification transistor M2 so as to supply a constant voltage to charge the secondary cell 52.

That is, the reference voltage Vr3 acts as a threshold voltage for switching from a constant current charging mode, in which a constant current is supplied to charge the secondary cell 52, to a constant voltage charging mode, in which a constant voltage is supplied to charge the secondary cell 52.

The voltage V1 from the current detection circuit 43 is input to the non-inverted input terminal of the error amplifier 3, and the output voltage Ver from the error amplifier 3 and the triangular wave TW are input to the PWM control circuit 5.

From the output voltage Ver and the triangular wave TW, the PWM control circuit 5 generates a control signal PD for switching the switching transistor M1 and outputs the control signal PD to the gate of the switching transistor M1, and generates a control signal ND for switching the synchronization rectification transistor M2, and outputs the control signal ND to the gate of the synchronization rectification transistor M2 The adaptor detection circuit 44 determines that the AC adaptor 51 is connected to the input terminal ADi when the voltage Vdd on the input terminal ADi is higher than a predetermined value or is in a predetermined range, and outputs the signal Sa to the charging control circuit 45, which indicates that the AC adaptor 51 is connected to the input terminal ADi.

Receiving the signal Sa indicating that the AC adaptor 51 is connected to the input terminal ADi, the charging control circuit 45 starts operations of the PWM circuit 15 and the drive circuit 16 (see FIG. 1) of the PWM control circuit 5 to starts operations of the PWM control circuit 5. On the other hand, if the signal Sa indicates that the AC adaptor 51 is not connected to the input terminal ADi, the charging control circuit 45 stops operations of the PWM circuit 15 and the drive circuit 16 of the PWM control circuit 5 to stop operations of the PWM control circuit 5, and to turn off the switching transistor M1 and the synchronization rectification transistor M2. Further, the control signal Sc from an external control circuit (not illustrated) is input to the charging control circuit 45, and in response to the control signal Sc, the charging control circuit 45 controls the PWM control circuit 5 in the same way as above.

In this way, the PWM control circuit 5 starts operations or stops operations in response to the control signal from the charging control circuit 45. In response to the output voltage Ver from the error amplifier 3 and the triangular wave TW from the triangular wave generation circuit 4, the PWM control circuit 5, which is in operation, alternately switches ON or OFF the switching transistor M1 and the synchronization rectification transistor M2, lowers the voltage provided by the AC adaptor 51 connected to the input terminal ADi, and outputs the lowered voltage through the output terminal BTo.

A COM terminal of the selection switch SW1 is connected to the substrate gate of the switching transistor M1, an S terminal of the selection switch SW1 is connected to the source of the switching transistor M1, and a D terminal of the selection switch SW1 is connected to the drain of the switching transistor M1.

The voltage on the input terminal ADi and the voltage on the output terminal BTo are input to the input output comparator 6, and in response to the difference between the two voltages, the input output comparator 6 controls switching ON and switching OFF of the selection switch SW1 and the switch SW2, and controls outputting of the control signal PD in the drive circuit 16 of the PWM circuit 15.

In the above configuration, when the AC adaptor 51 is connected to the input terminal ADi, since the voltage on the input terminal ADi is higher than the voltage on the output terminal BTo by a certain value, the input output comparator 6 connects the COM terminal of the selection switch SW1 to the S terminal of the selection switch SW1, and connects the substrate gate of the switching transistor M1 to the source of the switching transistor M1. At the same time, the input output comparator 6 turns off the switch SW2, disconnects the gate of the switching transistor M1 from the drain of the switching transistor M1, and starts outputting the control signal PD to the drive circuit 16 of the PWM control circuit 5. In addition, the adaptor detection circuit 44 detects that the AC adaptor 51 is connected to the input terminal ADi, and outputs the control signal Sa indicating that the AC adaptor 51 is connected to the input terminal ADi, and the charging control circuit 45 controls the PWM control circuit 5 to charge the secondary cell 52.

When the AC adaptor 51 is not connected to the input terminal ADi, the voltage on the input terminal ADi lowers. Upon detecting a lowered voltage on the input terminal ADi, the adaptor detection circuit 44 detects that the AC adaptor 51 is disconnected from the input terminal ADi, and outputs the control signal Sa to the charging control circuit 45 indicating that the AC adaptor 51 is not connected to the input terminal ADi. The charging control circuit 45 stops operations of the PWM control circuit 5 to stop charging the secondary cell 52.

In this state, the substrate gate of the switching transistor M1 is connected to the source of the switching transistor M1 through the selection switch SW1, and as a result, a current path is formed through the secondary cell 52, the output terminal BTo, the resistor 42, the inductor L, the parasitic diode D2, the COM terminal of the selection switch SW1, the S terminal of the selection switch SW1, and the input terminal ADi. On the input terminal ADi, a voltage close to the voltage of the secondary cell 52 is generated.

When the voltage on the input terminal ADi is less than or equal to the voltage on the output terminal BTo, the input output comparator 6 connects the COM terminal to the D terminal. When the voltage on the input terminal ADi is lowered to the voltage on the output terminal BTo, the input output comparator 6 controls the selection switch SW1 to connect the substrate gate with the drain of the switching transistor M1. At the same time, the input output comparator 6 turns on the switch SW2 to connect the gate of the switching transistor M1 with the drain of the switching transistor M1, and stops outputting the control signal PD to the drive circuit 16 of the PWM control circuit 5 to make the output terminal be in a high impedance state.

Due to this, the parasitic diode D1 turns out to be inserted between the output terminal BTo and the input terminal ADi in the reversed direction, and this shields a current from the output terminal BTo, and hence, the voltage on the input terminal ADi further decreases.

In this way, in response to the difference between the voltage on the input terminal ADi and the voltage on the output terminal BTo, the input output comparator 6 switches the substrate gate of the switching transistor M1 to connect to the source or the drain of the switching transistor M1, so that even when a voltage source is connected to the output terminal BTo, it is possible to prevent the reverse direction flow of a current to the input terminal ADi. Because a dedicated (always turned on) diode is not used for preventing the reverse direction flow, as in the related art, a voltage drop across the diode does not occur, it is possible to realize a charging circuit having low power efficiency degradation.

While the present invention is above described with reference to specific embodiments chosen for purpose of illustration, it should be apparent that the invention is not limited to these embodiments, but numerous modifications could be made thereto by those skilled in the art without departing from the basic concept and scope of the invention.

For example, the selection switch SW1 and the switch SW2 may also be implemented by using electronic circuits, for example, by a field effect transistor, such as a MOS transistor. Instead of the synchronization rectification transistor M2, a flywheel diode can be used.

In the above, it is described that the input output comparator 6 is a part of the switching regulator, but the input output comparator 6 may also be provided outside the switching regulator. In this case, the selection switch SW1 switches the connection of the substrate gate of the switching transistor M1 in response to a control signal from the outside.

According to the present invention, the selection switch SW1 is provided to control connection of the substrate gate of the switching transistor M1, which is a PMOS transistor, and in response to the difference between the voltage on the input terminal and the voltage on the output terminal, the input output comparator 6 controls the selection switch SW1. Therefore, it is possible to provide a switching regulator capable of preventing reverse direction flow of an electric current without using a dedicated diode even when a PMOS transistor is used as a switching element of a step-down switching regulator.

This patent application is based on Japanese Priority Patent Application No. 2004-211493 filed on Jul. 20, 2004.

The invention claimed is:

1. A switching regulator that is a step-down switching regulator for converting a voltage applied on an input terminal to a predetermined voltage and outputting the predetermined voltage from an output terminal, said switching regulator comprising:
a switching transistor formed from a PMOS transistor configured to switch ON or switch OFF output of the input voltage according to a control signal input to a control electrode;
a smoothing circuit configured to smooth the output voltage from the switching transistor and output the smoothed voltage to the output terminal;
a selection circuit configured to control connection of a substrate gate of the switching transistor according to the input control signal; and a switching transistor control circuit configured to control a switching operation of the switching transistor so that the voltage output from the output terminal becomes the predetermined voltage;

wherein the selection circuit connects the substrate gate to a drain of the switching transistor when the voltage on the input terminal is less than or equal to the voltage on the output terminal, and connects the substrate gate to a source of the switching transistor when the voltage on the input terminal is greater than the voltage on the output terminal.

2. The switching regulator as claimed in claim 1, further comprising:

a selection control circuit that compares the voltage on the input terminal to the voltage on the output terminal, and controls the selection operation of the selection circuit according to a comparison result;

wherein the selection control circuit controls the selection circuit to connect the substrate gate to the drain of the switching transistor when the voltage on the input terminal is less than or equal to the voltage on the output terminal, and controls the selection circuit to connect the substrate gate to the source of the switching transistor when the voltage on the input terminal is greater than the voltage on the output terminal.

3. The switching regulator as claimed in claim 2, further comprising:

a switching circuit that connects a gate of the switching transistor to the drain of the switching transistor;

wherein when the voltage on the input terminal is less than or equal to the voltage on the output terminal, based on a control signal from the selection control circuit, the switching circuit connects the gate of the switching transistor to the drain of the switching transistor while the switching transistor control circuit stops output of the control signal to the gate of the switching transistor; and when the voltage on the input terminal is greater than the voltage on the output terminal, based on the control signal from the selection control circuit, the switching circuit disconnects the gate of the switching transistor from the drain of the switching transistor while the switching transistor control circuit outputs the control signal to the gate of the switching transistor.

4. The switching regulator as claimed in claim 3, wherein the smoothing circuit includes a synchronization rectification transistor that is connected to the switching transistor in series and is controlled by the switching transistor control circuit to be switched on or switched off, wherein the switching transistor, the synchronization rectification transistor, the selection circuit, the switching transistor control circuit, and the switching circuit are integrated into one IC chip.

5. The switching regulator as claimed in claim 3, wherein the switching circuit includes a field effect transistor (FET).

6. The switching regulator as claimed in claim 3, wherein the smoothing circuit includes a synchronization rectification transistor that is connected to the switching transistor in series and is controlled by the switching transistor control circuit to be switched on or switched off, wherein the switching transistor, the synchronization rectification transistor, the selection circuit, the selection control circuit, the switching transistor control circuit, and the switching circuit are integrated into one IC chip.

7. The switching regulator as claimed in claim 1, wherein the selection operation of the selection circuit is controlled by an external selection control circuit according to the voltage on the input terminal and the voltage on the output terminal so that the selection circuit is controlled to connect the substrate gate to the drain of the switching transistor when the voltage on the input terminal is less than or equal to the voltage on the output terminal, and connect the substrate gate to the source of the switching transistor when the voltage on the input terminal is higher than the voltage on the output terminal.

8. The switching regulator as claimed in claim 1, wherein the selection circuit includes a field effect transistor (FET).

9. A power supply circuit, comprising:

one or more step-down switching regulators configured to convert a voltage applied on an input terminal to a predetermined voltage and output the predetermined voltage from an output terminal; and one or more linear regulators;

wherein the switching regulator includes a switching transistor formed from a PMOS transistor configured to switch ON or switch OFF output of the input voltage according to a control signal input to a control electrode;

a smoothing circuit configured to smooth the output voltage from the switching transistor and output the smoothed voltage to the output terminal;

a first selection circuit configured to control connection of a substrate gate of the switching transistor according to the input control signal, the first selection circuit connecting the substrate gate to a drain of the switching transistor when the voltage on the input terminal is less than or equal to the voltage on the output terminal, and connecting the substrate gate to a source of the switching transistor when the voltage on the input terminal is greater than the voltage on the output terminal; and a switching transistor control circuit configured to control a switching operation of the switching transistor so that the voltage output from the output terminal becomes the predetermined voltage.

10. The power supply circuit as claimed in claim 9, wherein the linear regulator comprises:

a voltage control transistor that includes a PMOS transistor configured to control a current from the input terminal to the output terminal to control the voltage on the output terminal;

a second selection circuit configured to control connection of the substrate gate of the voltage control transistor;

a second switching transistor control circuit configured to control a switching operation of the switching transistor so that the voltage output from the output terminal becomes the predetermined voltage;

a second selection control circuit that controls the selection operation of the selection circuit according to the voltage on the input terminal and the voltage on the output terminal, the second selection circuit connecting the substrate gate to a drain of the voltage control transistor when the voltage on the input terminal is less than or equal to the voltage on the output terminal, and connecting the substrate gate to a source of the voltage control transistor when the voltage on the input terminal is greater than the voltage on the output terminal; and a voltage control transistor control circuit configured to control the voltage control transistor so that the voltage output from the output terminal becomes the predetermined voltage.

11. The power supply circuit as claimed in claim 9, wherein the switching regulator further comprises:

a first selection control circuit that compares the voltage on the input terminal to the voltage on the output terminal, and controls the selection operation of the first selection circuit according to a comparison result;

wherein the first selection control circuit controls the first selection circuit to connect the substrate gate to the drain of the switching transistor when the voltage on the input terminal is less than or equal to the voltage on the output terminal, and controls the first selection circuit to connect the substrate gate to the source of the switching transistor when the voltage on the input terminal is greater than the voltage on the output terminal.

12. The power supply circuit as claimed in claim 11, wherein the switching regulator further comprises:

a switching circuit that connects a gate of the switching transistor with the drain of the switching transistor;

wherein when the voltage on the input terminal is less than or equal to the voltage on the output terminal, based on a control signal from the first selection control circuit, the switching circuit connects the gate of the switching transistor to the drain of the switching transistor while the switching transistor control circuit stops output of the control signal to the gate of the switching transistor; and when the voltage on the input terminal is greater than the voltage on the output terminal, based on the control signal from the first selection control circuit, the switching circuit disconnects the gate of the switching transistor from the drain of the switching transistor while the switching transistor control circuit outputs the control signal to the gate of the switching transistor.

13. The power supply circuit as claimed in claim 12, wherein the smoothing circuit includes a synchronization rectification transistor connected to the switching transistor in series and controlled by the switching transistor control circuit to be switched on or switched off, wherein the switching transistor, the synchronization rectification transistor, the first selection circuit, the switching transistor control circuit, the switching circuit, and the linear regulator are integrated into one IC chip.

14. The power supply circuit as claimed in claim 12, wherein the smoothing circuit includes a synchronization rectification transistor that is connected to the switching transistor in series and controlled by the switching transistor control circuit to be switched on or switched off, wherein the switching transistor, the synchronization rectification transistor, the first selection circuit, the first selection control circuit, the switching transistor control circuit, the switching circuit, and the linear regulator are integrated into one IC chip.

15. The power supply circuit as claimed in claim 9, wherein the selection operation of the first selection circuit is controlled by an external selection control circuit according to the voltage on the input terminal and the voltage on the output terminal so that the first selection circuit is controlled to connect the substrate gate to the drain of the switching transistor when the voltage on the input terminal is less than or equal to the voltage on the output terminal, and connect the substrate gate to the source of the switching transistor when the voltage on the input terminal is greater than the voltage on the output terminal.

16. A power supply circuit, comprising:

a plurality of step-down switching regulators each configured to convert a voltage applied on an input terminal to a predetermined voltage and output the predetermined voltage from an output terminal, wherein each of the switching regulators includes a switching transistor formed from a PMOS transistor configured to switch ON or switch OFF output of the input voltage according to a control signal input to a control electrode;

a smoothing circuit configured to smooth the output voltage from the switching transistor and output the smoothed voltage to the output terminal;

a selection circuit configured to control connection of a substrate gate of the switching transistor according to the input control signal, the selection circuit connecting the substrate gate to a drain of the switching transistor when the voltage on the input terminal is less than or equal to the voltage on the output terminal, and connecting the substrate gate to a source of the switching transistor when the voltage on the input terminal is greater than the voltage on the output terminal; and a switching transistor control circuit configured to control a switching operation of the switching transistor so that the voltage output from the output terminal becomes the predetermined voltage.

17. The power supply circuit as claimed in claim 16, wherein the switching regulator further comprises:

a selection control circuit that compares the voltage on the input terminal to the voltage on the output terminal, and controls the selection operation of the selection circuit according to a comparison result;

wherein the selection control circuit controls the selection circuit to connect the substrate gate to the drain of the switching transistor when the voltage on the input terminal is less than or equal to the voltage on the output terminal, and controls the selection circuit to connect the substrate gate to the source of the switching transistor when the voltage on the input terminal is greater than the voltage on the output terminal.

18. The power supply circuit as claimed in claim 17, wherein the switching regulator further comprises:

a switching circuit that connects a gate of the switching transistor with the drain of the switching transistor;

wherein when the voltage on the input terminal is less than or equal to the voltage on the output terminal, based on a control signal from the selection control circuit, the switching circuit connects the gate of the switching transistor to the drain of the switching transistor while the switching transistor control circuit stops output of the control signal to the gate of the switching transistor; and when the voltage on the input terminal is greater than the voltage on the output terminal, based on the control signal from the selection control circuit, the switching circuit disconnects the gate of the switching transistor from the drain of the switching transistor while the switching transistor control circuit outputs the control signal to the gate of the switching transistor.

19. The power supply circuit as claimed in claim 18, wherein the smoothing circuit includes a synchronization rectification transistor that is connected to the switching transistor in series and is controlled by the switching transistor control circuit to be switched on or switched off, wherein the switching transistor, the synchronization rectification transistor, the selection circuit, the switching transistor control circuit, and the switching circuit are integrated into one IC chip.

20. The power supply circuit as claimed in claim 18, wherein the smoothing circuit includes a synchronization rectification transistor that is connected to the switching transistor in series and is controlled by the switching transistor control circuit to be switched on or switched off, wherein the switching transistor, the synchronization rectification transistor, the selection circuit, the selection control circuit, the switching transistor control circuit, and the switching circuit are integrated into one IC chip.

21. The power supply circuit as claimed in claim 16, wherein the selection operation of the selection circuit is controlled by an external selection control circuit according to the voltage on the input terminal and the voltage on the output terminal so that the selection circuit is controlled to connect the substrate gate to the drain of the switching transistor when the voltage on the input terminal is less than or equal to the voltage on the output terminal, and connect the substrate gate to the source of the switching transistor when the voltage on the input terminal is greater than the voltage on the output terminal.

22. A secondary cell charging circuit, including a step-down switching regulator configured to convert a voltage applied on an input terminal to a predetermined voltage and output the predetermined voltage from an output terminal, a secondary cell being connected to the output terminal, wherein the switching regulator comprises:

a switching transistor formed from a PMOS transistor configured to switch ON or switch OFF output of the input voltage according to a control signal input to a control electrode;

a smoothing circuit configured to smooth the output voltage from the switching transistor and output the smoothed voltage to the output terminal;

a selection circuit configured to control connection of a substrate gate of the switching transistor according to the input control signal, the selection circuit connecting the substrate gate to a drain of the switching transistor when the voltage on the input terminal is less than or equal to the voltage on the output terminal, and connecting the substrate gate to a source of the switching transistor when the voltage on the input terminal is greater than the voltage on the output terminal; and a switching transistor control circuit configured to control a switching operation of the switching transistor so that the voltage output from the output terminal becomes the predetermined voltage.

23. The secondary cell charging circuit as claimed in claim 22, wherein the switching regulator further comprises:

a selection control circuit that compares the voltage on the input terminal to the voltage on the output terminal, and controls the selection operation of the selection circuit according to a comparison result;

wherein the selection control circuit controls the selection circuit to connect the substrate gate to the drain of the switching transistor when the voltage on the input terminal is less than or equal to the voltage on the output terminal, and controls the selection circuit to connect the substrate gate to the source of the switching transistor when the voltage on the input terminal is greater than the voltage on the output terminal.

24. The secondary cell charging circuit as claimed in claim 23, wherein the switching regulator further comprises:

a switching circuit that connects a gate of the switching transistor with the drain of the switching transistor;

wherein when the voltage on the input terminal is less than or equal to the voltage on the output terminal, based on a control signal from the selection control circuit, the switching circuit connects the gate of the switching transistor to the drain of the switching transistor while the switching transistor control circuit stops output of the control signal to the gate of the switching transistor; and when the voltage on the input terminal is greater than the voltage on the output terminal, based on the control signal from the selection control circuit, the switching circuit disconnects the gate of the switching transistor from the drain of the switching transistor while the switching transistor control circuit outputs the control signal to the gate of the switching transistor.

25. The secondary cell charging circuit as claimed in claim 24, wherein the smoothing circuit includes a synchronization rectification transistor that is connected to the switching transistor in series and is controlled by the switching transistor control circuit to be switched on or switched off, wherein the switching transistor, the synchronization rectification transistor, the selection circuit, the switching transistor control circuit, and the switching circuit are integrated into one IC chip.

26. The secondary cell charging circuit as claimed in claim 24, wherein the smoothing circuit includes a synchronization rectification transistor that is connected to the switching transistor in series and is controlled by the switching transistor control circuit to be switched on or switched off, wherein the switching transistor, the synchronization rectification transistor, the selection circuit, the selection control circuit, the switching transistor control circuit, and the switching circuit are integrated into one IC chip.

27. The secondary cell charging circuit as claimed in claim 22, wherein the selection operation of the selection circuit is controlled by an external selection control circuit according to the voltage on the input terminal and the voltage on the output terminal so that the selection circuit is controlled to connect the substrate gate to the drain of the switching transistor when the voltage on the input terminal is less than or equal to the voltage on the output terminal, and connect the substrate gate to the source of the switching transistor when the voltage on the input terminal is greater than the voltage on the output terminal.

* * * * *